J. H. ALLEN.
AUTOMOBILE.
APPLICATION FILED SEPT. 23, 1914.
1,230,361.
Patented June 19, 1917.
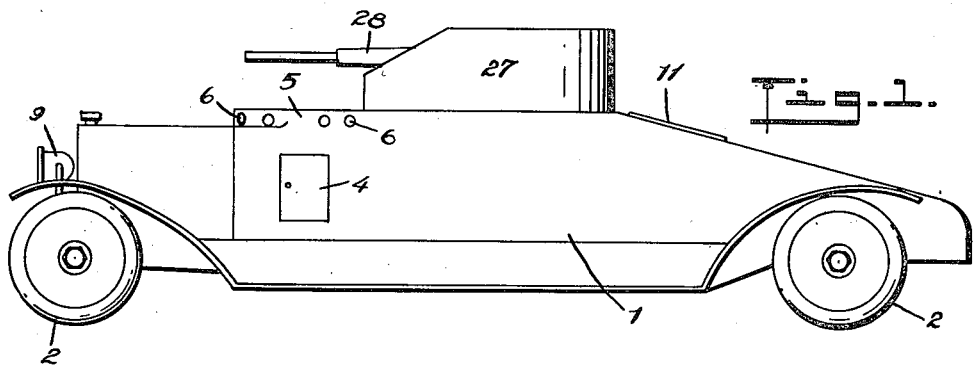
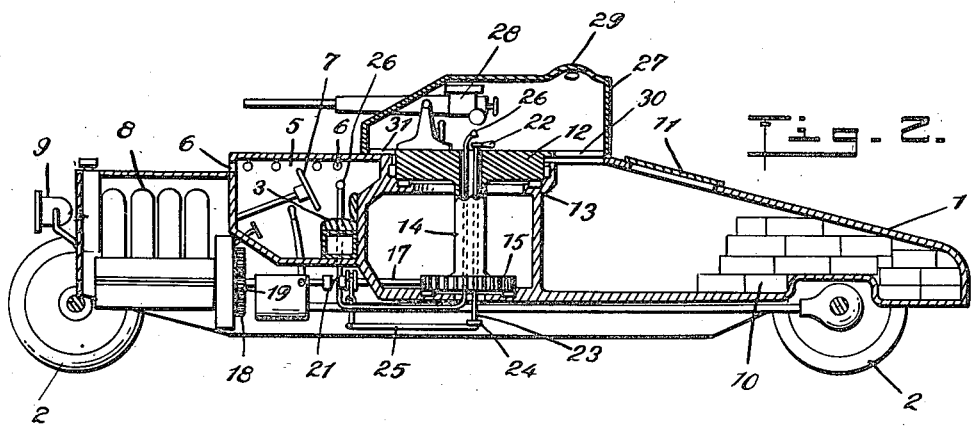
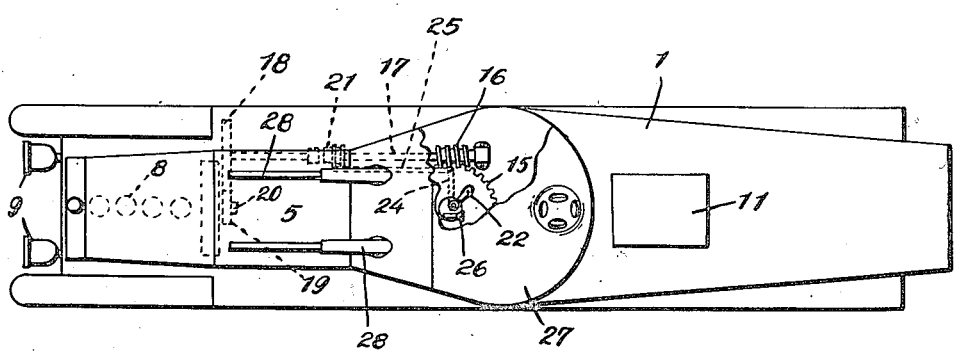
WITNESSES:
Howard P. King
Mildred E. Brooks
INVENTOR:
John H. Allen
BY
Russell M. Everett,
ATTORNEY.

UNITED STATES PATENT OFFICE.

JOHN H. ALLEN, OF NEW YORK, N. Y., ASSIGNOR TO ARMORED MOTOR CAR CORPORATION, OF NEW YORK, N. Y., A CORPORATION OF NEW YORK.

AUTOMOBILE.

1,230,361. Specification of Letters Patent. Patented June 19, 1917.

Application filed September 23, 1914. Serial No. 863,155.

*To all whom it may concern:*

Be it known that I, JOHN H. ALLEN, a citizen of the United States, and a resident of New York city, borough of Manhattan, in the State of New York, have invented certain new and useful Improvements in Automobiles, of which the following is a specification.

This invention relates to automobiles having a portion of the body adapted to revolve so as to change its alinement with respect to the direction of travel of the automobile at any desired angle thereto and then be operated according to its nature in such position. More especially the invention relates to an automobile intended for use in warfare or battle, being armored and provided with rapid fire guns or other kind of ordnance mounted thereon so as to be turned in any direction and fired as the automobile moves from place to place.

The objects of the invention are to adapt an automobile to an increased field of operations; to increase the facility with which such an automobile can be used; to avoid the necessity of bringing the body of the automobile into exact alinement or position by turning or driving; to extend the range of operation of the body after the automobile has reached a given position; to secure increased facility in the handling of a rapid fire gun or the like mounted upon an automobile; to secure an extensive range of such a gun in any direction and at a suitable angle of elevation or depression; to provide suitable accommodation and protection for the men operating the gun and also the automobile; to enable the gun to be operated by the engine of the automobile and yet controlled by the gunner; to secure a low center of gravity, so that the machine will not readily tip over; to provide for the convenient storage and access of a suitable quantity of ammunition; to secure a simple and effective construction, and to obtain other advantages and results as may be brought out in the following description.

Referring to the accompanying drawings, in which like numerals of reference indicate the same parts throughout the several views, Figure 1 shows in side elevation an armed automobile of my improved construction;

Fig. 2 is a central vertical longitudinal section of the same, and

Fig. 3 is a plan, partly broken away to show the gun turret and operating means more clearly.

It will be understood that my invention is adapted to be utilized in many different ways and upon many kinds of different automobiles for a great variety of purposes. For instance it can be employed in an auto truck provided with a body for carrying coal or the like which can be turned in any direction for dumping or discharging its load; or it can be employed in an auto truck having a rotatable crane adapted to pick up heavier articles or objects and transfer them from place to place; to as I have indicated the invention can be applied to automobiles intended for warfare, so that guns can be mounted upon the automobile and trained in any direction regardless of the position or direction of travel of the automobile.

There are many other uses to which the invention can be adapted without departing from its spirit and scope, and I do not wish to be understood as restricting myself to any particular use or to any particular one of them.

In the specific embodiment of the invention shown in said drawings, 1 indicates the armored body of an automobile having an underslung or low frame supported on wheels 2. A seat 3 is shown for the chauffeur, with a door 4 by which he gains access to the armored hood 5 inclosing the same and which is provided with sighting means 6 at the top so that he can observe the direction in which to drive. The steering wheel 7 is also indicated, and the engine is located in the usual place at the front of the vehicle as shown at 8 in Fig. 2. The vehicle may also be supplied with suitable headlights or searchlights 9 of any well-known construction adapted to illuminate the roadway or country over which the vehicle is traveling.

At the rear of the chauffeur's seat, and closely adjacent thereto, is a turret of the general type of those employed upon battleships, said turret being adapted to revolve through a complete circle and carrying suitable rapid fire machine guns or other ordnance. This turret is mounted upon the low frame of the automobile so as to keep its center of gravity down near the ground, and is preferably operated by the same engine which drives the automobile. The rear of the body 1 of the automobile provides an interior space for storing ammunition, as indicated at 10, and also has a door 11 by which the gunner and his assistant can enter the body and turret.

I have shown the disk or rotary plate 12 of the turret mounted in roller bearings upon an annular track 13 suitably supported upon the frame or chassis of the automobile, and from said plate 12 a tubular stem 14 depends to a gear 15 engaged by a worm 16 upon a driven shaft 17, said shaft 17 having a gear 18 which meshes with another gear 19 upon the engine shaft 20. The worm shaft 17 is shown provided with a clutch 21 which can be thrown in or out to rotate or stop the turret, and the means for operating this clutch lead through the hollow stem 14 into the gun turret within convenient access of the gunner. I have shown such means as comprising a handle 22 within the turret fast upon a shaft 23 rotatably mounted in the stem 14 and carrying at its lower end an arm 24 which is connected by a link 25 to the clutch 21 so as to slide the same. Obviously any other suitable operating means could be employed if desired, however, for enabling the turret to be operated from within itself.

It will thus be seen that the rotation of the gun turret is under the control of the gunner, while the chauffeur merely directs the movement or travel of the automobile. As stated I prefer to drive both from the automobile engine, but I desire to be understood as within the scope of my invention to operate the gun turret from an auxiliary engine of any suitable kind and suitably located upon the automobile body. In that way, the gun turret could continue to be operated, even though the automobile engine was stopped or damaged.

Means of communication between the gunner and chauffeur are provided, so that they may act in accord, and for this purpose I have shown a speaking tube 26 leading from the gun turret down through its tubular supporting stem 14 and so up into the chauffeur's compartment or hood convenient of access by him. Any other signaling apparatus could be employed, however.

The turret body 27 carried by the disk or rotary plate 12 is preferably oval or elliptical, as usual, and has mounted within it in any suitable and ordinary manner one or more rapid fire machine guns or other ordnance of any approved type. I have shown two such guns designated by reference numerals 28, 28, and obviously by turning the turret these guns can be pointed in any desired direction. The turret is provided with a sighting hood 29 for the gunner, and at its bottom has an entrance 30 through which the gunner enters from the body of the automobile. The ammunition may also be passed to the gunner in the turret by his assistant in the ammunition chamber of the body, through said entrance 30, as well as through an opening 31 which is provided for the purpose when the turret is turned.

It will be understood that the automobile is armored in any suitable manner to protect its various parts, and that any well-known features of automobile or ordnance construction can be applied, as desired. Furthermore, various detail modifications may be made in manufacturing my improved device or apparatus without departing from the spirit and scope of the invention, and I do not wish to be understood as limiting myself except as required by the following claim when construed in the light of the prior art.

Having thus described the invention, what I claim is.

The combination with a wheeled vehicle, of a gun turret mounted thereon and an engine, means for driving said vehicle from said engine, a gear fixed with respect to said turret below the same adjacent the floor of the vehicle, a worm in mesh with said gear and means for releasably connecting said worm with the engine for driving the same.

JOHN H. ALLEN.

Witnesses:
ALEXANDER L. HILLYARD,
RUSSELL M. EVERETT.